United States Patent [19]

Flanagan

[11] 4,345,349
[45] Aug. 24, 1982

[54] ADHESIVE FOR PERFECT BOUND BOOKS AND METHOD OF USING SAME

[75] Inventor: Thomas P. Flanagan, Green Brook, N.J.

[73] Assignee: National Starch and Chemical Corporation, Bridgewater, N.J.

[21] Appl. No.: 288,500

[22] Filed: Jul. 30, 1981

[51] Int. Cl.$^3$ ............... B42C 9/02; C08L 91/06; C08L 93/04
[52] U.S. Cl. ............... 412/5; 524/271; 524/505; 412/8
[58] Field of Search ............... 260/27 EV, 27 BB; 11/1 AD

[56] References Cited

U.S. PATENT DOCUMENTS

| | | | |
|---|---|---|---|
| 3,644,252 | 2/1972 | Shenfeld et al. | 260/27 EV |
| 3,686,107 | 8/1972 | Russell | 260/27 BB |
| 3,787,531 | 1/1974 | Dahlquist et al. | 260/27 BB |
| 3,821,143 | 6/1974 | Cluff et al. | 260/27 BB |
| 3,837,994 | 9/1974 | Flanagan et al. | 260/27 BB |
| 3,850,858 | 11/1974 | Park | 260/27 BB |
| 4,105,611 | 8/1978 | Orth | 260/27 EV |
| 4,146,521 | 3/1979 | Godfrey | 260/27 BB |

OTHER PUBLICATIONS

Book Publication Magazine, Mar. 1981, p. 46.
Inland Printer/American Lithographer, Jan. 1974, p. 56.
Japanese Unexamined Patent Application 55-147538, Nov. 17, 1980, Nitto Electric Ind.

*Primary Examiner*—H. S. Cockeram
*Attorney, Agent, or Firm*—James & Franklin

[57] ABSTRACT

Hot melt adhesives especially suited for use in the perfect binding of books are prepared from (1) 15–30% of a block polymer having the general configuration

A-B-A wherein A is a non-elastomeric polymer block derived from the moieties of a monovinyl aromatic hydrocarbon radical and B is an elastomeric polymer block derived from the moieties of a conjugated diene monomer;
(2) 5–10% of an ethylene vinyl acetate copolymer containing 17 to 42% vinyl acetate; wherein the ratio of the block polymer to the ethylene vinyl acetate copolymer is within the range of 1.75:1 to 6:1;
(3) 25–40% of at least one rosin ester tackifier selected from the group consisting of glycerol and pentaerythritol esters of natural and modified rosins,
(4) 25–35% of a wax diluent which is solid at room temperature; and
(5) 0.5 to 3% of at least one stabilizer.

such composition being characterized by an ability to form a film exhibiting Instron yield strengths of 100–250 psi. and a low temperature flexibility of less than 10° F.; such composition having a melt viscosity of 3,000 to 30,000 cps. at 350° F., and being capable of setting up in less than 30 seconds and, when applied to roughened signature using perfect binding techniques yielding a book having an adhesion page pull on coated stock of at least 10 pounds, preferably at least 15 pounds, per page (7⅜ to 7½" long).

In addition to the adhesive described above, the present invention also discloses a method for binding books containing a plurality of sheets including at least some coated stock by means of the perfect binding method without the use of a primer using the novel adhesive of the present invention.

7 Claims, No Drawings

ADHESIVE FOR PERFECT BOUND BOOKS AND METHOD OF USING SAME

BACKGROUND OF THE INVENTION

The "perfect" binding of books with hot melt adhesives is a high speed, continuous operation used in the book-binding industry for the binding of paper-back books, catalogs, magazines, etc. In this operation, the books are printed in sheets or long continuous webs which are cut, folded and properly arranged to form a series of stacks, referred to as signatures, which are then fed into a revolving mechanism equipped with clamps. The folded edges of the clamped sheets are first cut to remove the signature folds, and then the edges of the sheets are roughened so as to expose a maximum amount of fibers and thereby render them more receptive to the hot melt adhesive composition. A layer or coat of the molten adhesive composition is then applied by means of a suitable applicator, after which a paper backing or other suitable cover is applied before the molten adhesive sets to form the spine of the book. The perfect bound book is then trimmed to the desired size, and optionally the exposed sheet edges are colored as by painting or dyeing to give the finished product.

Hot melt adhesive compositions useful for the perfect binding of books serve at least two critical functions. In the first place, they must hold the book together during its formation. Thus, it is necessary that they be capable of forming thin films in the molten state; that they wet rapidly; that they have good tack or adhesion for similar and dissimilar sheets ranging from coated paper, enameled stock, cross and long grain, coated or uncoated sheets, groundwood or sulfite; that they be quick setting but not so quick as to prevent the cover from bonding; and that they be capable of exhibition a required range of viscosities in order to be applicable for use with any available and generally suitable hot melt applicator. Secondly, on cooling or setting, the hot melt adhesive must be able to produce spines having good "wear potential" so as to be capable of preventing the book from falling apart. Wear potential includes the properties of high bonding strength, flexibility, high film strength (tensile strength) and resistance to aging, mold growth, and "cold crack." "Cold crack" is the undesirable hardness of the spine which prevents the opening of a book to 360°, i.e. so that the covers are back-to-back to one another, without causing the spine to split. This characteristic is dependent upon temperature and is of particular importance when books are exposed to cold climates. Since the perfect bound book has no staples, threads, stitches, etc., cracking of the spine causes the book to split.

An additional requirement of many publishers is the feature that the book or magazine be "easy-opening", i.e., that the two-page spread may be completely opened and will remain in the open position when placed down, as on a table or the like. This characteristic is in direct contrast to the behavior exhibited by conventional stiff paperback books which will snap closed as soon as they are placed down (known in the trade as "mousetrapping"). These books can normally be kept open only by exerting pressure directly on the spine so as to loosen, break or crack the adhesive binding.

The conventional adhesives are often limited in their effectiveness as hot melts for the perfect binding of books because they are only mediocre with regard to one or more of the properties enumerated above. Often it has been necessary to compromise certain properties in order to obtain products having at least a narrow range of useful properties. Thus, for example, hot melts based on polyvinyl acetate have shown poor warm flow (i.e. undesirable softness) and high cold crack characteristics. In addition, hot melts based on ethylene-vinyl acetate copolymer systems have experienced various adhesive problems and the books which have been bound with the latter hot melts have exhibited poor "easy-opening" properties. U.S. Pat. No. 3,837,994 teaches a hot melt adhesive which overcomes the previously described problems but which has been found to be limited in its commercial applicability due to a primer step being required when the adhesive is to be used on coated stock in conjunction with the high speed equipment found in the many operating plants. The use of this primer in order to obtain superior properties is a drawback, particularly in the case of magazines which are issued weekly where, in order to maintain the large scale production and widespread circulation requirements, multiple plants (often with multiple lines) are simultaneously run. It will be appreciated that the multiplication of equipment required if primers are to be used (primer applicators, etc.) is constrained both from an economic as well as a physical limitation.

It is therefore an object of the present invention to provide a method for the perfect binding of books which does not require the use of a primer even for coated stocks. Another object is to provide such a method which does not require the user to compromise any of the useful characteristics and especially the easy opening and cold crack characteristics. It is also an object of the invention to provide a novel hot melt adhesive for use in such a process.

PERFECT BINDING ADHESIVE REQUIREMENTS

As can be seen from the above, a hot melt adhesive providing the features of the present invention must be formulated within very precise boundaries in order to obtain the necessary balance of properties. Therefore, in preparing such adhesive compositions we have found the following properties tend to be critical:

Fast set: When used without the primer, the hot melt compositions of U.S. Pat. No. 3,837,994 capable of bonding coated papers possess setting speeds which are generally too slow for use on machines running at speeds greater than about 180 clamps per minute reaching the trimmer in 30–35 seconds. This slow setting speed causes gumming of the machine parts in the trimming operation with the uncured adhesive stringing and smearing on the edges of the bound and trimmed book. The adhesive of the present invention must therefore cure (set-up) within 30 seconds, preferably within 26 seconds, from the time it was applied while still providing adequate adhesion.

Viscosity: In order to function on the machines utilized it is necessary that the adhesive have a melt viscosity within the range of about 3,000 to 30,000 cps at 350° F.

Yield strength: The adhesive film itself must have a critical balance in yield strength as measured in accordance with Test Method A of ASTM Procedure D882-5GT on an Instron Tensile Tester using a separation rate of 20″/min. The yield strength must be sufficiently high so as to prevent the page from pulling out when turned but must be low enough to allow for easy opening properties. We have found that most adhesives based on EVA possess a yield strength too high to be suitable for use where easy opening properties are required. Thus, adhesives formulated within the scope of the present invention must have a yield strength of 100 to 250 psi.

Low temperature flexibility: The adhesive must exhibit a low temperature flexibility of less than about 10° F., preferably −15° to −25° F.; i.e., no cold crack at such temperatures.

Page pull: Once the book has been formed, it is necessary to ascertain whether the adhesive has sufficient strength to prevent the book from being easily pulled apart. This testing is done using a Page Pull Tester and is referred to as page pull test. The adhesives formulated for use herein must exhibit a page pull of at least 10 pounds, preferably at least 15 pounds, per page when tested on coated stock (page length 7⅝ to 7½" long).

Non-pressure sensitive: A pressure sensitive adhesive is one which remains tacky for prolonged periods (or permanently) after being coated upon a surface. In the perfect binding process utilized herein, the semi-finished books must be trimmed to the desired final size after application of the adhesive. A tacky adhesive (i.e. one that is pressure sensitive) cannot be used for book binding because the adhesive would undesirably accumulate on the knives or blades used in the cutting operation and the random spreading of the adhesive would ruin the books. It is thus essential that the adhesives used in the process of the present invention be non-pressure sensitive.

SUMMARY OF THE INVENTION

I have found that these specific properties can be obtained utilizing a non-pressure sensitive hot melt adhesive composition comprising on a weight basis:

(1) 15–30% of a block polymer having the general configuration

A-B-A wherein A is a non-elastomeric polymer block derived from the moieties of a monovinyl aromatic hydrocarbon radical and B is an elastomeric polymer block derived from the moieties of a conjugated diene monomer;

(2) 5–10% of an ethylene vinyl acetate copolymer containing about 17 to 42% vinyl acetate; the weight ratio of the block polymer to the ethylene vinyl acetate copolymer being within the range of 1.75:1 to 6:1;

(3) 25–40% of at least one rosin ester tackifier selected from the group consisting of glycerol and pentaerythritol esters of natural and modified rosins, (4) 25–35% of a wax diluent which is solid at room temperature; and (5) 0.5 to 3% of at least one stabilizer;
such composition being characterized by an ability to form a film exhibiting Instron yield strengths of 100–250 psi. and a low temperature flexibility of less than 10° F. (preferably −15° to −25° F.); such composition having a melt viscosity of 3,000 to 30,000 cps. at 350° F., and being capable of setting up in less than 30 seconds and, when applied to roughened signatures using perfect binding techniques, yielding a book having an adhesion page pull on coated stock of at least 10 pounds, preferably at least 15 pounds, per page (7⅝ to 7½" long).

In addition to the adhesive described above, the present invention also discloses a method for binding books containing a plurality of sheets by means of the perfect binding method, the steps for producing a spine for said books comprising;

(A) applying to the secured edges of such sheets a molten film of hot melt non-pressure sensitive adhesive composition comprising on a weight basis, (1) 15–30% of a block polymer having the general configuration

A-B-A wherein A is a non-elastomeric polymer block derived from the moieties of a monovinyl aromatic hydrocarbon radical and B is an elastomeric polymer block derived from the moieties of a conjugated diene monomer;

(2) 5–10% of an ethylene vinyl acetate copolymer containing about 17 to 42% vinyl acetate; the weight ratio of the block polymer to the ethylene vinyl acetate copolymer being within the range of 1.75:1 to 6:1;

(3) 25–40% of at least one rosin ester tackifier selected from the group consiting of glycerol and pentaerythritol esters of natural and modified rosins;

(4) 25–35% of a wax diluent which is solid at room temperature; and (5) 0.5 to 3% of at least one stabilizer;
such film being characterized by an Instron yield strength of 100 to 250 psi. and a low temperature flexibility of less than 10° F.; such composition having a melt viscosity of 3,000 to 30,000 cps. at 350° F., and a set up time of less than 30 seconds, and, when applied to roughened signatures using perfect binding techniques, yielding a book having an adhesion page pull on coated stock of at least 10 pounds, preferably at least 15 pounds, per page (7⅝ to 7½" long); and (B) allowing such film to solidify.

If a softcover book is to be formed, the cover is applied directly to the molten film, otherwise, the book is forwarded to be cased in using conventional techniques to form a hardcover book.

DETAILED DESCRIPTION OF THE PREFERRED EMBODIMENT

The block copolymer used herein may be more specifically descirbed as an unvulcanized elastomeric block polymer wherein the respective monomeric moieties are arranged in an alternating sequence having the general configuration A-B-A wherein A is a nonelastomeric polymer block derived from the moieties of a monovinyl aromatic hydrocarbon monomer and B is an elastomeric polymer block derived from the moieties of a conjugated diene monomer, the total concentration of the A block therein ranging from about 20 to 50%, based on the total weight of the polymer. An additional nomenclature which has been applied to these three unit block polymers is $(SSS)_n$-$(BBB)_n$-$(SSS)_n$ wherein S represents the moieties derived from the vinyl substituted aromatic hydrocarbon monomer in which the vinyl group is attached to a nuclear carbon atom and B represents the moieties derived from the conjugated diene monomer. Styrene is ordinarily used as the monovinyl aromatic hydrocarbon member, while butadiene-1,3 and isoprene are the most frequently used conjugated diene members. Thus, for example, sytrene-butadienestyrene polymers are commercially available under the trademarks "Kraton 1101" and "Kraton 1102", while styrene-isoprenestyrene polymers are commercially available under the trademarks "Kraton 1107" and "Kraton 1111." All of the latter designated block polymers are sold by the Shell Chemical Company.

Methods for preparing the latter block polymers are well known to those skilled in the art, typical procedures being disclosed in U.S. Pat. 3,265,765, issued Aug. 9, 1966. These procedures generally involve the solution polymerization of a mixture containing the monovinyl aromatic hydrocarbon monomer and the conjugated diene monomer in the presence of a catalyst of the formula $R(Li)_x$ wherein x is an integer having the value of from 1 to 4 and R is a hydrocarbon radical selected from the group consisting of aliphatic, cycloaliphatic and aromatic radicals.

The ethylene-vinyl acetate copolymers useful herein are those copolymers containing from about 17 to about 42% vinyl acetate, preferably 17 to 29%, based on the weight of the copolymer. Commercially available ethylene-vinyl acetate copolymers that are expecially suited for use herein are sold by DuPont under the trademark "Elvax". For example, Elvax 250 contains 27.2 to 28.8% vinyl acetate and has a melt index of 38-48 dg/min., while Elvax 420 contains 17.5 to 18.5% vinyl acetate and has a melt index of 136-165 dg./min. The melt index is a value determined by ASTM D 1238 procedure and reflects the molten flow character of the copolymer. The higher the number, the greater the flow, and vice versa. Greater flow also reflects lower molecular weight and lower molten viscosity, and vice versa. A blend of copolymers could be used by selectively choosing high and low melt index copolymers to arrive at a desired median melt index, viscosity etc.

While many tackifiers are known in the art for use in hot melt systems, we have found that superior performance is achieved herein by the use of rosin ester tackifiers. These tackifiers are selected from the group consisting of glycerol and pentaerythritol esters of natural and modified rosins and include, for example, the glycerol ester of gum, tall or wood rosin, the glycerol ester of hydrogenated rosin and the pentaerythritol esters of the corresponding rosins.

The wax diluents employed herein are used to reduce the melt viscosity or cohesive characteristics of the hot melt adhesive compositions without appreciably decreasing their adhesive binding characteristics. Useful diluents are those which are solid at room temperature and include the petroleum waxes, such as paraffin wax having a melting point of from about 130° to 165° F. and microcrystalline waxes having a melting point of from about 140° to 200° F. (the latter melting points being determined by ASTM method D127-60), and synthetic waxes made by polymerizing carbon monoxide and hydrogen such as Fischer-Tropsch wax as well as the alpha-olefins containing at least 24 carbon atoms.

The stabilizers which are present in the hot melt systems of this invention serve to protect the otherwise vulnerable block polymer, and thereby the total adhesive system, from the thermal and oxidative degradation which is frequently encountered during the manufacture and application of the adhesive as well as in the ordinary exposure of the final adhered product. Such degradation is usually manifested by deterioration in appearance, physical properties and performance. Among the applicable stabilizers are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and, correspondingly, its reactivity, this steric hindrance thus providing the phenolic compound with its stabilizing properties. Representative hindered phenols include:

1,3,5-trimethyl-2,4,6-tris (3.5-di-tert-butyl-4-hydroxybenzyl)benzene;

pentaerythrityl tetrakis-3(3,5-di-tert-butyl-4-hydroxyphenyl)propionate;

n-octadecyl-3(3,5-ditert-butyl-4-hydroxyphenol)-propionate;

4,4'-methylenebis (2,6-di-tert-butyl phenol);

2,2'-methylenebis (4-methyl-6-tert-butylphenol);

4,4'-thiobis (6-tert-buty-o-cresol);

2,5-ditertiary amyl hydroquinone;

2,6-di-tert-butylphenol;

6-(4-hydroxyphenoxy)-2,4-bis(n-octylthio)-1,3,5-triazine;

2,4,6-tris-(4-hydroxy-3,5-di-tert-butylphenoxy)-1,3,5-triazine;

tetrakis (methylene 3-3', 5-di-tert-butyl-4'-hydroxyphenyl propionate)-methane, di-n-octadecyl 3,5-di-tert-butyl-4-hydroxybenzylphosphonate;

2-(n-octylthio)ethyl 3,5-di-tert-butyl-4-hydroxybenzoate; and sorbitol hexa [3-(3,5-di-tert-butyl-4-hydroxyphenol)propionate].

The performance of these stabilizers may be further enhanced by utilizing, in conjunction therewith: (1) synergists such as, for example, thiodipropionate esters and phosphites; and (2) chelating agents and metal deactivators such as, for example, ethylenediamine tetraacetic acid, salts thereof, and disalicylalpropylenediimine.

With regard to proportions, the hot melt compositions of the present invention comprise on a weight basis 15–30%, preferably 18–25%, of the block copolymer; 5–10%, preferably 8–10%, of the ethylene vinyl acetate copolymer; 25–40%, preferably 25–38%, of the tackifier, 25–35%, preferably 30–35%, of the wax and 0.2 to 3%, preferably 0.4–0.75%, of the stabilizer. In addition to meeting the percentage ranges described hereinabove, it is also important to formulate the adhesives so as to assure that the weight ratio of block polymer to ethylene vinyl acetate copolymer is within the range of 1.75:1 to 6:1.

Optional additives may be incorporated into the hot melt compositions of this invention in order to modify certain properties thereof. Among these additives may be included: colorants such as titanium dioxide; fillers such as talc and clay; non-blocking agents, etc.

Not all compositions formulated within the component ranges described herein will inherently possess the requirements for the perfect binding of books and it may be necessary to adjust the various components and/or amounts within the claimed ranges or otherwise modify the formulation in order to obtain a suitable hot melt adhesive for particular stock, application, etc. Thus, it may be necessary to change the melt index of the ethylene vinyl acetate copolymer in order to obtain a composition having a melt viscosity within the required range. Lowering the vinyl acetate content with respect to the ethylene has been found to increase the yield strength.

Additionally, the yield strength may be increased by decreasing the amount of the block polymer. Higher levels of block polymer and/or lower levels of rosin ester will provide for better low temperature flexibility. If it is desired to adjust the setting speed of the formulated adhesive, this may be done by selecting a tackifier having a higher softening point or by adding a higher melting point wax. The adhesion page pull may be increased by adding more rosin ester. It will be recognized that the above suggested modifications serve only as guidelines and other methods familar to those skilled in the art may be used to modify the basic adhesive formulations so as to achieve all the properties required of the hot melt adhesives of the present invention.

The procedure for preparing these hot melt adhesive compositions involves placing approximately half of the total tackifying resin concentration in a jacketed mixing kettle, preferably in a jacketed heavy duty mixer of the Baker-Perkins or Day type, which is equipped with rotors and thereupon raising the temperature to a range of from about 250° to 350° F., the precise temperature utilized depending on the melting point of the particular tackifying resin. When the resin has at least partially melted, mixing is initiated and the block polymer, ethylene vinyl acetate copolymer and stabilizer are added together with any optional additives whose presence may be desired. Mixing and heating are continued until a smooth, homogeneous mass is obtained whereupon the remainder of the tackifying resin and the wax diluent are thoroughly and uniformly admixed therewith. The resulting hot melt adhesive composition is drawn off and may be used immediately in hot pots; or it may be molten-extruded into rope form or converted into pellets, rods, cylinders, slats or billets depending on the equipment which is used to cool the hot melt down to solidification; or it may be placed in cooling pans and held in bulk form for later use.

The hot melts of this invention are typically applied at temperatures ranging from about 300° to 400° F., a preferred melt viscosity of from about 3,000 to 30,000 centipoises, and a wet film thickness of from about 5 to 25 mils when utilized in the perfect binding operation of this invention. As previously noted, the basic perfect binding technique, as conceived by the novel process of this invention, comprises the steps of: (1) printing, cutting, folding and arranging the signatures; (2) cutting the signatures to remove the signature folds and to expose a fully squared backbone; (3) roughing the backbone so as to expose the fibers at the back edge and make them more receptive to the hot melt composition; (4) applying the hot melt composition by means of any conventional equipment employed in the perfect binding industry so as to provide a continuous film or coating over the entire back surface of the sheets; (5) applying a suitable cover, for example, paper backing, kraft, crash or full cover, to the molten hot melt coating; (6) allowing the adhesive to solidify thereby forming the spine of the book; and (7) trimming the perfect bound book to the proper size. Subsequently, the edges of the front and ends of the sheet may be dyed or painted, when desired.

In a variation of the above described process, the application of the backing or cover to the molten hot melt coating in step (5) is omitted so that the molten adhesive on the spine is simply permitted to solidify. An additional coating (or coatings) of hot melt adhesive (either the same or other formulation) is subsequently applied on top of the first coating and, while the adhesive film is still in its molten form, a layer of crash and paper are bonded to the spine. The book as this stage is termed "lined-up" and may thereafter be "cased-in" by means of the secured crash and endsheets in conventional fashion so as to form a hardcover book. Other conventional methods for the formation of hardcover books may also be employed using the adhesive of the present invention.

The following examples will further illustrate the embodiment of this invention. In these examples all parts given are by weight unless otherwise noted.

Testing Procedures

*Viscosity* is determined by a Brookfield Thermosel using a #27 spindle. *Low Temperature Flexibility*—The molten hot melt was cast, by means of a heated Bird applicator, onto a polytetrafluorethylene-coated steel sheet yielding a film having a dry film thickness of 20 mils. After cooling, the film specimen was stripped from the plate and cut into $\frac{1}{2} \times 2$ inch test specimens. A representative specimen was then placed in a temperature controlled, carbon dioxide cabinet for a period of 10 minutes whereupon it was immediately flexed to a 180° angle. Where the specimen did not crack as a result of this procedure, a second identical specimen was placed in the cabinet at a lower temperature and the flexing procedure repeated. The temperature at which the specimen eventually cracked was thus noted as its "low temperature flexibility" or "cold crack" value. As the latter value is decreased, there is a corresponding increase in the flexibility and stability which can be expected upon exposing these films and the books bound therewith to low temperature conditions. *Instron Yield Strength*—This property was determined according to Test Method A of ASTM procedure D88256T utilizing an Instron Tensile Tester; the films having been prepared according to the method set forth in the above described "Low Temperature Flexibility" test. *Adhesion Page Pull*—In this test a page is actually pulled out of a book by a clamping device that is connected to a force gauge. The best result is obtained when the page tears rather than pulls out of the book, however, page pull values of 10 to 20 lbs. are acceptable.

EXAMPLE I

This example illustrates the preparation of a hot melt adhesive composition typical of the products of the present invention as well as the improved properties thereof which enable it to be effectively utilized in a perfect binding operation.

A heavy duty mixer which had been heated to 300° F. and which was equipped with rotor blades was charged with 12.5 parts of a glycerol ester of rosin. This tackifying resin was partially melted. Agitation was then initiated whereupon 20 parts Kraton 1101, 10 parts Elvax 260, and 0.4 parts tetrakis(methylene 3-3′, 5-di-tert-butyl-4′hydroxyphenyl proprionate)methane as stabilizer were added slowly in order to prevent the formation of lumps. Heating and mixing were continued until a homogeneous mass was obtained whereupon 25.0 parts additional rosin ester and 32.5 parts wax were admixed therewith.

The resulting homogeneous hot melt composition had a melt viscosity of 6,125 cps. at 350° F., and produced films having a yield strength of 140 psi and a cold crack value of −30° to −35° F. The adhesive was used to bind a book including coated stock using the perfect binding techniques with no prior priming; it set up quickly (within 26 sec.), with no "stringing" and produced a book exhibiting a page pull on coated stock of 13.7 pounds.

EXAMPLE II

This example illustrates the use of varying components and amounts in order to produce adhesives within the scope of the present invention.

Six adhesive compositions were prepared as in Example I using the component and amounts shown in Table I below. All compositions exhibited a set up time less than 26 seconds and were characterized by the viscosity, yield strength and cold crack characteristics also shown in Table I.

TABLE I

| Component | A | B | C | D | E | F |
|---|---|---|---|---|---|---|
| Kraton 1101 | 30 | 20 | 25 | 20 | 25.4 | 25.4 |
| Elvax 250 | — | — | 5 | — | 8.5 | 8.5 |
| Elvax 260 | 5 | 10 | — | 10 | — | — |
| Glycerol ester of rosin | 35 | — | 37.5 | — | — | — |
| Pentacrythritol ester of rosin | — | 37.5 | — | — | — | — |
| Glycerol ester of partially hydrogenated rosin | — | — | — | — | 33.1 | 33.1 |
| Glycerol ester of fully hydrogenated rosin | — | — | — | 37.5 | — | — |
| Petroleum wax | 30 | 32.5 | 32 | 32.5 | 33.1 | 20.3 |
| Fischer-Tropsch wax | — | — | — | — | — | 12.7 |
| Stabilizer | 0.4 | 0.4 | 0.4 | 0.4 | 0.4 | 0.2 |
| Viscosity, cps at 350° F. | 17,375 | 7,375 | 6,375 | 5,000 | 8,375 | 7,000 |
| Yield Strength, psi | 110 | 145 | 180 | 115 | 105 | 150 |
| Cold Crack, °F. | −20 to −30 | −15 to −20 | −15 to −20 | −15 to −20 | −25 to −30 | −15 to −20 |

COMPARATIVE FORMULATIONS

The following compositions outside the scope of the present invention were prepared using the method described in Example I and were found unacceptable for use in a primerless perfect book binding applications including coated stock at least for the reasons noted.

| Composition G - a typical ethylene vinyl acetate hot melt adhesive. | |
|---|---|
| Elvax 260 | 30 parts |
| Tackifying resin | 35 parts |
| Petroleum wax | 35 parts |
| Stabilizer | 0.75 parts |

The composition exhibited a viscosity of 4,500, a too high yield strength of 600 psi and a too high cold crack of 30° to 35° F. When used to produce a "perfect bound" book, a page pull value of 14.2 lbs. was obtained, however, the book was very stiff and exhibited unacceptable "mousetrapping" properties.

| Composition H - a product within the scope of U.S. Pat. No. 3,837,994. | |
|---|---|
| Kraton 1101 | 32.5 parts |
| Glycerol ester of rosin | 37.5 parts |
| Petroleum wax | 30 parts |
| Stabilizer | 0.4 parts |

This composition had a viscosity of 12,500 cps, a too low yield strength of 50 psi and cold crack of −30° to −40° F. When used without a primer in the perfect binding operation, it was slow to set thereby causing machining problems, and exhibited a page pull of only 8.3 pounds.

| Composition I - a product within the range of the polymeric content described in the present invention but outside the blank polymer ethylene vinyl acetate copolymer ratio. | |
|---|---|
| Kraton 1101 | 15 parts |
| Elvax 260 | 10 parts |
| Glycerol ester of rosin | 40 parts |
| Petroleum wax | 35 parts |
| Stabilizer | 0.4 parts |

The composition had a viscosity of 2,250 cps, a yield strength of 220 and cold crack of 20° to 25° F. Such a poor cold crack value rendered the product unacceptable for use in the perfect binding operation.

| Composition J - a product outside the component ranges of the adhesives of the present invention. | |
|---|---|
| Kraton 1101 | 31 parts |
| Elvax 260 | 14 parts |
| Pentaerythritol ester of rosin | 50 parts |
| Petroleum wax | 12.5 parts |
| Stabilizer | 2.5 parts |

The composition had a viscosity of 27,000, a too high yield strength of 490 and a relatively poor cold crack of −10° to −15° F. Books prepared using this adhesive would be too stiff and exhibit unacceptable "mousetrapping" properties.

It is understood that variations in the proportions, procedures and materials discribed above may be made without departing from the scope and spirit of the invention as defined by the following claims.

I claim

1. A non-pressure sensitive hot melt adhesive composition comprising on a weight basis:

(1) 15–30% of at least one block polymer having the general configuration

A-B-A wherein A is a non-elastomeric polymer block derived from the moieties of a monovinyl aromatic hydrocarbon radical and B is an elastomeric polymer block derived from the moieties of a conjugated diene monomer;

(2) 5–10% of at least one ethylene vinyl acetate copolymer containing 17 to 42% vinyl acetate, where the weight ratio of block polymer to ethylene vinyl acetate copolymer is within the range of 1.75:1 to 6:1;

(3) 25-40% of at least one rosin ester tackifier selected from the group consisting of glycerol and pentaerythritol esters of natural and modified rosins;

(4) 25-35% of at least one wax diluent which is solid at room temperature; and (5) 0.5 to 3% of at least one stabilizer; said composition being characterized by an ability to form a film exhibiting Instron yield strengths of 100 to 250 psi. and a low temperature flexibility of less than 10° F., said composition having a melt viscosity of 3,000 to 30,000 cps. at 350° F. and being capable of setting up in less than 30 seconds and, when applied to roughened signatures using perfect binding techniques yielding a book having an adhesion page pull on coated stock of at least 10 pounds per page having a length of 7⅜ to 7½ inches.

2. The composition of claim 1 wherein the monovinyl aromatic hydrocarbon monomer moieties in the block polymer are derived from styrene and the conjugated diene monomer moieties are derived from butadiene-1,3 or isoprene.

3. The composition of claim 1 wherein the ethylene vinyl acetate copolymer contains 17 to 29% vinyl acetate based on the weight of the copolymer.

4. The composition of claim 1 wherein the tackifier is selected from the group consisting of the glycerol esters of gum, tall or wood rosin; the glycerol ester of hydrogenated rosin and the pentaerythritol esters of the corresponding rosins.

5. A method for binding books containing a plurality of sheets by means of the perfect binding method, the steps for producing a spine for said books comprising:

(A) securing the edges of such sheets and applying thereto a molten film of a hot melt non-pressure sensitive adhesive composition comprising on a weight basis:

(1) 15-30% of at least the block polymer having the general configuration

A-B-A wherein A is a non-elastomeric polymer block derived from the moieties of a monovinyl aromatic hydrocarbon radical and B is an elastomeric polymer block derived from the moieties of a conjugated diene monomer;

(2) 5-10% of at least one ethylene vinyl acetate copolymer containing 17% to 42% vinyl acetate; where the weight ratio of the block polymer to the ethylene vinyl acetate copolymer is within the range of 1.75:1 to 6:1;

(3) 25-40% of at least one rosin ester tackifier selected from the group consisting of glycerol and pentaerythritol esters of natural and modified rosin, (4) 25-35% of at least one wax diluent which is solid at room temperature; and (5) 0.5 to 3% of at least one stabilizer; said film being characterized by an Instron yield strength of 100 to 250 psi., and a low temperature flexibility of less than 10° F., said composition having a melt viscosity of 3,000 to 30,000 cps. at 350° F. and a set up time of less than 30 seconds and, when applied to roughened signatures using perfect binding techniques yielding a book having an adhesion page pull on coated stock of at least 10 pounds per page having a length of 7⅜ to 7½ inches;

(B) allowing said film to solidify.

6. The process of claim 5 wherein a cover is applied to the film while the film is still in the molten state.

7. The process of claim 5 wherein the book block is cased in to form a hardcover book.

* * * * *